UNITED STATES PATENT OFFICE.

GEORGE B. BURNHAM, OF GLENDALE, CALIFORNIA.

PROCESS OF RECOVERING VALUABLE COMPONENTS IN A LIQUID PHASE.

1,424,447. Specification of Letters Patent. Patented Aug. 1, 1922.

No Drawing. Application filed January 8, 1920. Serial No. 350,158.

*To all whom it may concern:*

Be it known that I, GEORGE B. BURNHAM, a citizen of the United States, residing at Glendale, in the county of Los Angeles and State of California, have invented a certain new and useful Improvement in Processes of Recovering Valuable Components in a Liquid Phase, of which the following is a specification.

This invention relates to the process of recovering at least two components saturated in a liquid phase containing three or more components by making use of the properties of supersaturation.

An object of the invention is to provide a cheap process for recovering valuable components in a liquid phase.

The invention possesses other advantageous features, some of which, with the foregoing will be set forth in the following description, where I shall outline in full one form of the process of my invention.

I shall describe the process as applied to a liquid phase formed by the solution of salts in water and particularly to a saturated aqueous solution of potassium chloride and borax, but it is understood that the process is not limited to this particular liquid phase.

This liquid phase has four components, namely: water, potassium chloride, borax, and sodium chloride. The latter component is capable of being formed in solution by the union of the positive ions of the borax with the negative ions of the potassium chloride.

In the preferred form of the process, the saturated aqueous solution of potassium chloride and borax is cooled. The solubility of these two salts in water decreases with the temperature, and therefore they will crystallize out of solution once crystallization is started. However, the potassium chloride starts its crystallization with much greater ease and rapidity than borax. That is, it is relatively very easy to obtain a supersaturated solution of borax, and therefore upon cooling, the potassium chloride crystallizes out, but the borax remains in the solution in a state of supersaturation.

The solution is allowed to continue to crystallize out potassium chloride until the state of supersaturation with borax has become as great as the solution will stand, whereupon, the solution is transferred to another container, the temperature maintained approximately the same, and the supersaturated borax allowed to crystallize out. Usually the agitation of transferring the solution is sufficient to start crystallization of the borax, but if not, a few crystals of borax can be added, which innoculates the solution, and causes the crystallization of the supersaturated borax.

The phenomena of supersaturation is well known in aqueous solutions of salts, and it is common in most any liquid from which a solid is capable of being deposited. The tendency toward supersaturation is nearly always greater with some substances than with others. Hence, the process can be applied to most any two substances capable of being deposited from a liquid by allowing the substance least likely to be supersaturated to be deposited first, and the substance most capable of supersaturation to be deposited second. Furthermore, the supersaturation is increased if the liquid is allowed to remain quiet, and it can be prevented by adding a little of the solid substance with which the liquid is supersaturated. Hence, when a liquid phase is encountered saturated with two components whose tendency towards supersaturation is about the same, a little of the solid substance of one of the two components with which the liquid is saturated is added before or during the cooling. In this manner, one of the components are deposited from out of the liquid phase, while the second component remains supersaturated in the liquid. As soon as the supersaturation with the second component has become as great as it is practical to withstand, the liquid phase is transferred to another container, wherein by agitation, or by adding some of the second component in solid form, it will be deposited. Thus, by this process, the separation and recovery of the solid substances dissolved in a liquid can be readily accomplished.

It is not always necessary to create the state of supersaturation by a process of cooling, for this can also be accomplished by evaporation, and also—in a few instances—by heating, where the solubility of the two saturated components decreases with the increase of temperature.

In some cases, a third or other component in the liquid phase, may be deposited out along with or in chemical combination with the first or second component. An example of this is shown in the above instance where the borax crystallizes out with water of crystallization. The water is another component in the liquid phase depositing out in chemical combination with the borax.

I claim:

1. The process of recovering potassium chloride and borax, saturated in an aqueous solution, which consists in cooling the solution to cause a state of supersaturation with the borax and a deposit of potassium chloride, removing the solution from the deposited potassium chloride, maintaining the solution at approximately the same temperature, and crystallizing out the supersaturated borax from the removed solution.

2. The process of recovering potassium chloride and borax from a liquid containing the same, which consists in causing a state of supersaturation with borax and a deposit of potassium chloride, removing the liquid from the deposited potassium chloride and causing the supersaturated borax to be deposited from the removed liquid.

3. The process of recovering potassium chloride and borax from a liquid containing the same, which consists in causing a state of supersaturation with borax and a deposit of potassium chloride, separating the potassium chloride from the liquid, and agitating the liquid to cause the supersaturated borax to be deposited.

4. The process of recovering borax and a potassium salt from a liquid containing the same, which consists in causing a state of supersaturation with borax and a deposit of the potassium salt, removing the liquid from the deposited potassium salt, and agitating the liquid to cause the supersaturated borax to be deposited from the removed liquid.

5. The process of recovering borax and another salt saturated in a liquid containing the same, which consists in causing a state of supersaturation with the borax and causing a deposit of the other salt, removing the liquid from deposited salt, and causing the borax to be deposited from the removed liquid.

6. The process of recovering borax from a liquid that is saturated with borax and other salts, which consists in causing the liquid to deposit at least one salt and causing a state of supersaturation with the borax, removing the liquid from the deposited salts, agitating the removed liquid to cause the liquid to deposit borax and recovering the borax.

GEORGE B. BURNHAM.